US008027064B2

(12) United States Patent
Shin

(10) Patent No.: US 8,027,064 B2
(45) Date of Patent: Sep. 27, 2011

(54) CONTROLLING COLOR IMAGE FORMATION BY EXTENDING COLOR CHANNELS BASED ON BOUNDARY REGION INFORMATION TO COMPENSATE FOR MIS-REGISTRATION DISTORTIONS

(75) Inventor: Sang Youn Shin, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 699 days.

(21) Appl. No.: 12/038,050

(22) Filed: Feb. 27, 2008

(65) Prior Publication Data

US 2008/0212117 A1 Sep. 4, 2008

(30) Foreign Application Priority Data

Mar. 2, 2007 (KR) ........................ 10-2007-0020949

(51) Int. Cl.
*H04N 1/58* (2006.01)

(52) U.S. Cl. ........................ 358/3.26; 358/518; 358/540

(58) Field of Classification Search .................. 358/1.9, 358/3.26, 3.27, 518, 530, 540; 382/167, 382/275

See application file for complete search history.

(56) References Cited

U.S. PATENT DOCUMENTS

| | | | | |
|---|---|---|---|---|
| 6,341,020 | B1 * | 1/2002 | Rumph et al. | 358/1.9 |
| 6,345,117 | B2 * | 2/2002 | Klassen | 382/167 |
| 6,433,889 | B1 * | 8/2002 | Tanabe | 358/1.9 |
| 6,456,394 | B1 | 9/2002 | Gwaltney et al. | |
| 6,738,159 | B2 * | 5/2004 | Harrington | 358/1.9 |
| 7,206,446 | B2 * | 4/2007 | Sawada | 382/167 |
| 7,733,546 | B2 * | 6/2010 | Yamada | 358/518 |

FOREIGN PATENT DOCUMENTS

JP 2002252777 A * 9/2002

OTHER PUBLICATIONS

KR Office Action issued Apr. 18, 2011 in KR Application No. 10-2007-0020949.

* cited by examiner

*Primary Examiner* — Scott A Rogers
(74) *Attorney, Agent, or Firm* — Stanzione & Kim, LLP

(57) ABSTRACT

A method of controlling a color image forming apparatus capable of preventing an image from being distorted at a boundary of a color image region due to mis-registration to improve printing quality. The method includes determining whether original image data is in a color image region, detecting boundary region information on a plurality of color channels when the original image data is in the color image region, selecting a channel to be extended using the detected boundary region information, and extending the selected channel.

18 Claims, 13 Drawing Sheets

FIG. 5

| | | |
|---|---|---|
| a0 | a1 | a2 |
| a7 | a8 | a3 |
| a6 | a5 | a4 |

C CHANNEL index=1(falling edge), A=1, B=0, C=0
M CHANNEL index=2(rising edge), A=0, B=1, C=1
Y CHANNEL index=0,
K CHANNEL index=0,
window_K[1][0] ≠ 0

C CHANNEL index=1(falling edge), A=1, B=0, C=0
M CHANNEL index=2(rising edge), A=0, B=0, C=1
Y CHANNEL index=0,
K CHANNEL index=0

C CHANNEL index=1(falling edge), A=1, B=0, C=0
M CHANNEL index=2(rising edge), A=0, B=1, C=1
Y CHANNEL index=0
K CHANNEL index=0,
window_K[1][0] ≠ 0

C CHANNEL index=1(falling edge), A=1, B=0, C=0
M CHANNEL index=2(rising edge), A=0, B=1, C=1
Y CHANNEL index=1(falling edge), A=1, B=0, C=0
K CHANNEL index=0,
window_K[1][0] ≠ 0

FIG. 7B

| C CHANNEL | | | | M CHANNEL | | | | Y CHANNEL | | | | K CHANNEL | | | | EXTENDED CHANNEL |
|---|---|---|---|---|---|---|---|---|---|---|---|---|---|---|---|---|
| index | A | B | C | index | A | B | C | index | A | B | C | index | A | B | C | |
| 1 | 1 | 0 | X | 2 | 0 | 1 | X | 1 | 1 | 0 | X | X | X | X | X | C, Y |
| 1 | 1 | 0 | X | X | X | X | X | 1 | 1 | 0 | X | 2 | 0 | 1 | X | C, Y |

ORIGINAL IMAGE
BEFORE CORRECTION

DISTORTED
OUTPUT IMAGE

CORRECTED IMAGE AFTER CORRECTION

CORRECTED OUTPUT IMAGE

<ACTUAL IMAGE BEFORE CORRECTION>

<ACTUAL IMAGE AFTER CORRECTION>

CONTROLLING COLOR IMAGE FORMATION BY EXTENDING COLOR CHANNELS BASED ON BOUNDARY REGION INFORMATION TO COMPENSATE FOR MIS-REGISTRATION DISTORTIONS

CROSS-REFERENCE TO RELATED APPLICATIONS

This application claims priority under 35 U.S.C. §119(a) from Korean Patent Application No. 2007-20949, filed on Mar. 2, 2007, in the Korean Intellectual Property Office, the disclosure of which is incorporated herein in its entirety by reference.

BACKGROUND OF THE INVENTION

1. Field of the Invention

The present general inventive concept generally relates to a method of controlling a color image forming apparatus, and more particularly, to a method of controlling a color image forming apparatus to compensate for distortion of an output image caused by a mis-registration during a printing of a color document.

2. Description of the Related Art

In general, an image forming apparatus converts a document created by a user who desires to print the document through an application program or an image photographed by the user using a digital camera into coded data to print the data on a recording paper so that the user can see the data.

An image forming apparatus capable of performing color printing includes toners of various colors, such as cyan (C), magenta (M), yellow (Y), and black (B). The color of printed data is realized by the combination of the toners of the various colors to be printed.

Different from a black-and-white printer, the color image forming apparatus paints one surface many times with different colors to print a color document. At this time, if in the process of painting one surface with various colors, the colors cannot be accurately painted on precise locations due to various reasons, such a phenomenon is referred to as mis-registration.

In particular, due to the mis-registration, dots of various colors scatter at a boundary of a color image so that remarkable image distortion may occur.

In this case, the dots of the various colors scatter at the boundary of the color image due to the mis-registration.

This is because positions of C, M, Y, and K dots on an image do not coincide with positions of the dots generated during the printing.

That is, the C, M, Y, and K dots deviate from the positions where the dots are to be marked due to a mechanical error, so that such a phenomenon occurs.

An image is distorted due to the mis-registration so that picture quality deteriorates.

SUMMARY OF THE INVENTION

Accordingly, the present general inventive concept provides a method of controlling a color image forming apparatus to prevent an image from being distorted at a boundary of a color image region due to mis-registration, and thus, to improve picture quality.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of controlling a color image forming apparatus that prints a color image using a plurality of color channels, the method including determining whether original image data is in a color image region, detecting boundary region information on the plurality of color channels when it is determined that the original image data is in the color image region, and selecting a color channel to be extended using the detected boundary region information to extend the selected channel.

The plurality of color channels may include C, M, Y, and K channels.

The determining of whether the original image data is in a color image region may include setting 3×3 windows for the C, M, Y, and K channels and generating C, M, Y, and K bit maps to determine whether the original image data is in the color image region based on whether patterns of the C, M, Y, and K channels coincide with each other and whether the K channel is flat.

The determining of whether the original image data is in a color image region may further include determining that the patterns of the C, M, Y, and K channels do not coincide with each other when all of the C, M, Y, and K channels are not simultaneously dot on or dot off in all pixels of the 3×3 windows.

The determining of whether the original image data is in a color image region may further include calculating a variance value from an average value of window values in a position where the K channel bit map is dot on among values in the 3×3 window and pixel values that are dot on in the 3×3 window to determine that the K channel is not flat when the calculated variance value is larger than or equal to a previously set value.

The detecting of the boundary region information may include extracting edge information and directional information on the C, M, Y, and K channels, and detecting the boundary region information on the C, M, Y, and K channels by using the extracted edge information and directional information.

The detecting of the boundary region information may further include extracting pixel values from the C, M, Y, and K channels to determine whether the C, M, Y, and K channels are adjacent to each other, and detecting the boundary region information on the C, M, Y, and K channels using the extracted pixel values.

The selecting of the color channel to be extended may include comparing a previously set and stored lookup table and the detected boundary region information with each other to select a channel to be extended and extending the selected channel.

The foregoing and/or other aspects and utilities of the present general inventive concept are also achieved by providing a method of controlling a color image forming apparatus that prints a color image using a plurality of color channels, the method including determining whether original image data is in a color image region based on whether patterns of the color channels coincide with each other and whether a reference color channel is flat, extracting edge information and directional information on the color channels to detect boundary region information on the color channels based on the extracted edge information and directional information when it is determined that the original image data is in the color image region, and selecting a channel to be extended using the detected boundary region information to extend the selected channel.

The determining of whether the original image data is in a color image region may include setting 3×3 windows for the color channels and generating a plurality of bit maps for each color channel to determine whether the original image data is in the color image region based on whether patterns of the color channels coincide with each other and whether the reference color channel is flat.

The color channels may include C, M, Y, and K channels, and K may be the reference color channel.

The determining of whether the original image data is in a color image region may include setting 3×3 windows for the C, M, Y, and K channels and generating C, M, Y, and K bit maps to determine whether the original image data is in the color image region based on whether patterns of the C, M, Y, and K channels coincide with each other and whether the K channel is flat.

The determining of whether the original image data is in a color image region may further include determining that the patterns of the C, M, Y, and K channels do not coincide with each other when all of the C, M, Y, and K channels are not simultaneously dot on or dot off in all pixels of the 3×3 windows.

The determining of whether the original image data is in a color image region may further include calculating a variance value from an average value of window values in a position where the K channel bit map is dot on among values in the 3×3 window and pixel values that are dot on in the 3×3 window to determine that the K channel is not flat when the calculated variance value is larger than or equal to a previously set value.

The extracting of the edge information and directional information may include extracting pixel values from the C, M, Y, and K channels in order to determine whether the C, M, Y, and K channels are adjacent to each other, and detecting the boundary region information on the C, M, Y, and K channels using the extracted pixel values.

The selecting of the channel to be extended may include comparing a previously set and stored lookup table and the detected boundary region information with each other to select a channel to be extended and extending the selected channel.

The foregoing and/or other aspects and utilities of the present general inventive concept are also achieved by providing a method of controlling a color image forming apparatus that prints a color image using a plurality of color channels, the method including determining boundary information of the plurality of color channels to determine whether original image data are is in a color image region, and extending one color channel using the detected boundary according to whether the color channels are adjacent.

The extending of the color channel may include comparing a stored boundary information lookup table and the detected boundary region information to select the channel to be extended.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 5 is a view illustrating an input image set by a 3×3 window according to the present general inventive concept;

FIG. 7B is a view illustrating an example of a lookup table according to FIG. 7A;

DETAILED DESCRIPTION OF THE PREFERRED EMBODIMENTS

Figure 1:
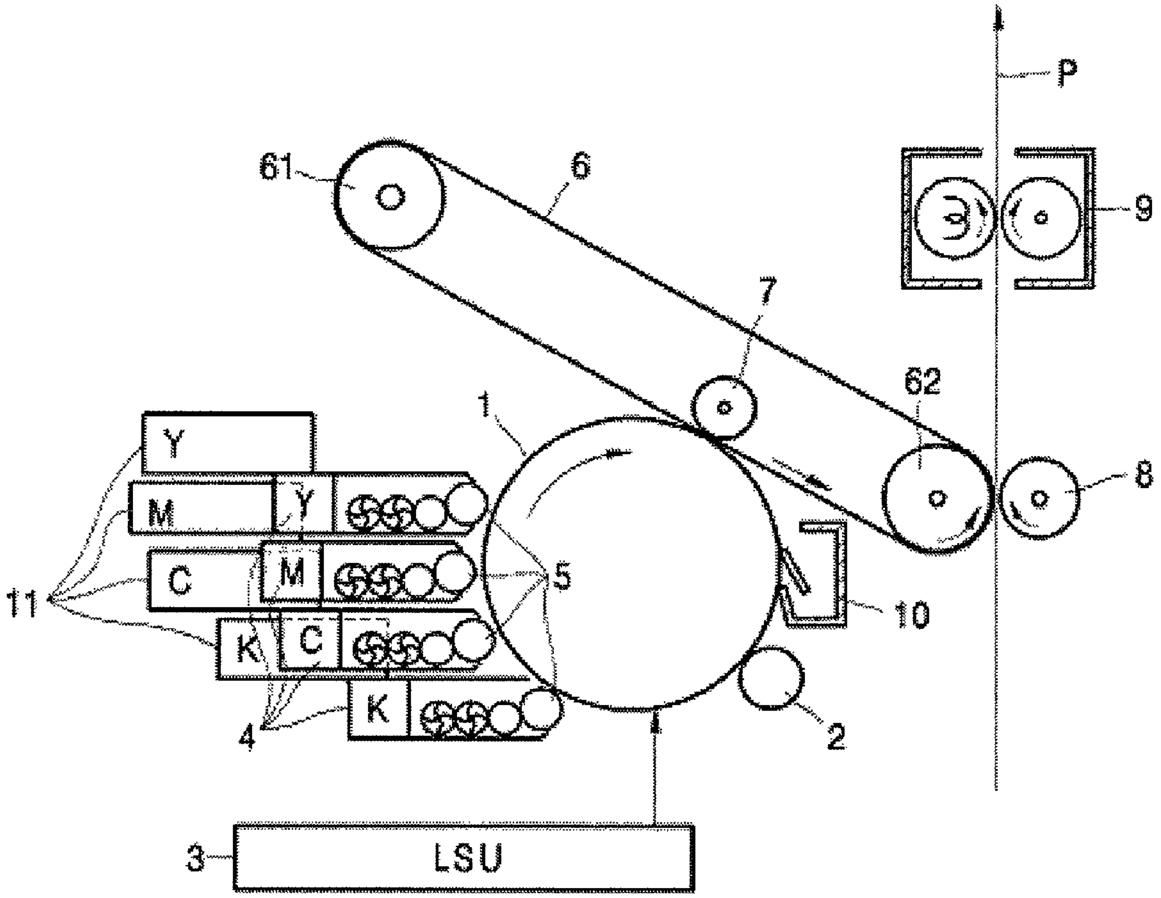
FIG. 1 is a schematic block diagram illustrating a color image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram illustrating a color image forming apparatus according to an embodiment of the present general inventive concept. Referring to FIG. 1, the color image forming apparatus may include a photoconductive drum 1, a charging roller 2, an exposing unit 3, a developing cartridge 4, an intermediate transferring belt 6, a first transferring roller 7, a second transferring roller 8, and a fixing unit 9.

The photoconductive drum 1 can be obtained by forming an optical conductive layer on an external circumference of a cylindrical metal drum.

The charging roller 2 is an example of a charging unit that charges the photoconductive drum 1 to a uniform electric potential. The charge roller 2 can supply charges while rotating in contact or not in contact with the external circumference of the photosensitive drum 1 to charge the external circumference of the photoconductive drum 1 to the uniform electric potential. A corona charging unit (not illustrated) can be used as the charging unit instead of the charging roller 2. The exposing unit 3 scans light corresponding to image information to the photoconductive drum 1 charged to have the uniform electric potential to form an electrostatic latent image. A laser scanning unit (LSU) that uses a laser diode as a light source is commonly used as the exposing unit 3.

The color image forming apparatus according to the present general inventive concept may use cyan (C), magenta (M), yellow (Y), and black (B) toners in order to print a color image. However, the present general inventive concept is not limited thereto, and other color toners, or other numbers of color toners may be used. Hereinafter, when it is necessary to distinguish elements from each other in accordance with a color, Y, M, C, and K will follow reference numerals that denote the elements.

The color image forming apparatus according to the present embodiment may include four toner cartridges 11Y, 11M, 11C, and 11K in which the cyan (C), magenta (M), yellow (Y), and black (B) toners are accommodated, and four developing units 4Y, 4M, 4C, and 4K that receive the toners from the toner cartridges 11Y, 11M, 11C, and 11K, respectively, to develop the electrostatic latent image formed in the photoconductive drum 1. The developing units 4 may include developing rollers 5 in a traveling direction of the photoconductive drum 1. The developing units 4 can be positioned so that the developing rollers 5 are separated from the photoconductive drum 1 by a developing gap. The developing gap is preferably several tens or several hundreds of microns. In a multi-path method color image forming apparatus, the plurality of developing units 4 operate sequentially. For example, a developing bias is applied to the developing roller 5 of a selected developing unit (for example, 4Y) and the developing bias is not applied or a development preventing bias to prevent the toners from being developed is applied to the remaining developing units (for example, 4M, 4C, and 4K).

In addition, only the developing roller 5 of the selected developing unit (for example, 4Y) rotates and the developing rollers 5 of the remaining developing units (for example, 4M, 4C, and 4K) do not rotate.

The intermediate transferring belt 6 is supported by supporting rollers 61 and 62 to travel at a traveling linear velocity equal to a rotation linear velocity of the photoconductive drum 1.

The length of the intermediate transferring belt 6 can be equal to or larger than the length of a paper P of a maximum size used for the image forming apparatus. The first transferring roller 7 faces the photosensitive drum 1 and a first transferring bias to transfer the toner image developed in the photoconductive drum 1 to the intermediate transferring belt 6 is applied to the first transferring roller 7. The second transferring roller 8 is provided to face the intermediate transferring belt 6. The second transferring roller 8 is separated from the intermediate transferring belt 6 while the toner image is transferred from the photoconductive drum 1 to the intermediate transferring belt 6 and contacts the intermediate transferring belt 6 under a predetermined pressure when the toner image is completely transferred to the intermediate transferring belt 6. A second transferring bias to transfer the toner image to the paper is applied to the second transferring roller 8. A cleaning unit 10 can be provided to remove the toner that remains in the photoconductive drum 1 after performing the toner transferring.

Color image forming processes performed by the above-described structure will be simply described. Light corresponding to image information on, for example, yellow (Y) is radiated from the exposing unit 3 to the photoconductive drum 1 charged to the uniform electric potential by the charging roller 2. An electrostatic latent image corresponding to a yellow (Y) image is formed in the photoconductive drum 1. The developing bias is applied to the developing roller 5 of the yellow developing unit 4Y. Then, the yellow (Y) toner is attached to the electrostatic latent image so that a yellow (Y) toner image is transferred to the photoconductive drum 1. The yellow (Y) toner image is transferred to the intermediate transferring belt 6 by the first transferring bias applied to the first transferring roller 7.

When the yellow (Y) toner image of one page amount is completely transferred, the exposing unit 2 scans light corresponding to, for example, magenta (M) image information to the photoconductive drum 1 re-charged to the uniform electric potential by the charging roller 2 to form an electrostatic latent image corresponding to a magenta (M) image. The magenta developing unit 4M supplies the magenta (M) toner to the electrostatic latent image to develop the electrostatic latent image. A magenta (M) toner image formed in the photoconductive drum 1 is transferred to the intermediate transferring belt 6 to overlap the previously transferred yellow (Y) toner image. When the above-described processes are performed on cyan (C) and black (K), a color toner image obtained by overlapping the yellow (Y), magenta (M), cyan (C), and black (K) toner images is formed on the intermediate transferring belt 6. The color toner image is transferred by the second transferring bias to the paper P that passes between the intermediate transferring belt 6 and the second transferring roller 8. The fixing unit 9 can apply heat and pressure to the color toner image to fix the color toner image to the paper.

The color image forming apparatus according to the embodiment of the present general inventive concept having the above structure prevents the color image from being distorted due to mis-registration, in particular, it removes a phenomenon in which a color is vague or dots of various colors scatter at a boundary of the color image to correct the image distortion. The color image forming apparatus paints one surface with various colors many times to print a color document unlike a black-and-white printer. At this time, if in processes of painting one surface with various colors, it is not possible to correctly paint desired positions with the colors due to various causes, such a phenomenon is referred to as mis-registration. According to the present general inventive concept, a hardware method is not used but printed data are preprocessed so that the color image is printed to be close to an original image in spite of a mechanical error.

Figure 2:
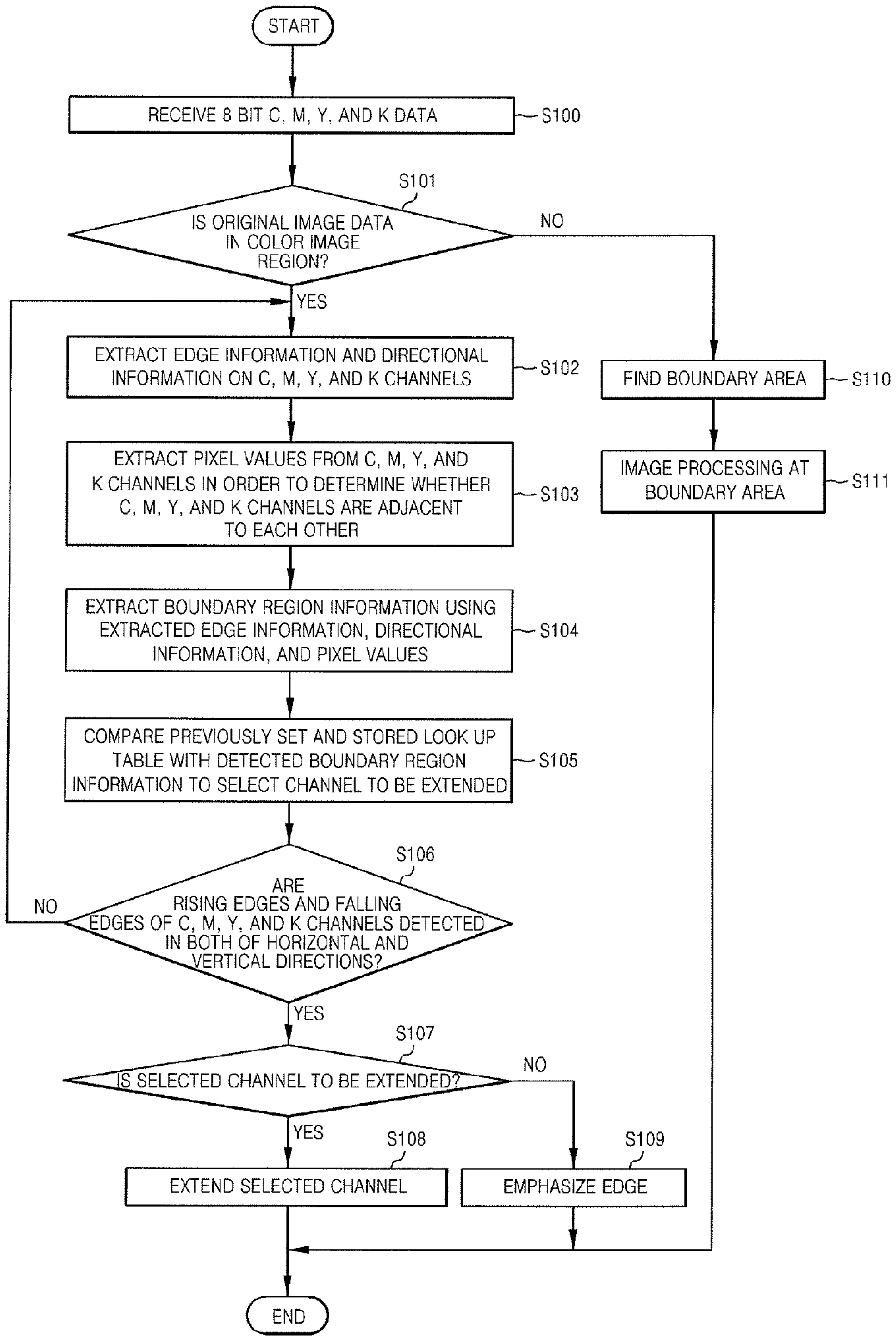
FIG. 2 is a flowchart illustrating a method of controlling a color image forming apparatus according to an embodiment of the present general inventive concept.

FIG. 2 is a flowchart illustrating a method of controlling the color image forming apparatus according to an embodiment of the present general inventive concept. As illustrated in FIG. 2, first, 8 bit color printed data items of C, M, Y, and K required during color printing are received in operation S100.

Then, it is determined whether original image data is in a color image region in operation S101.

Figure 3:
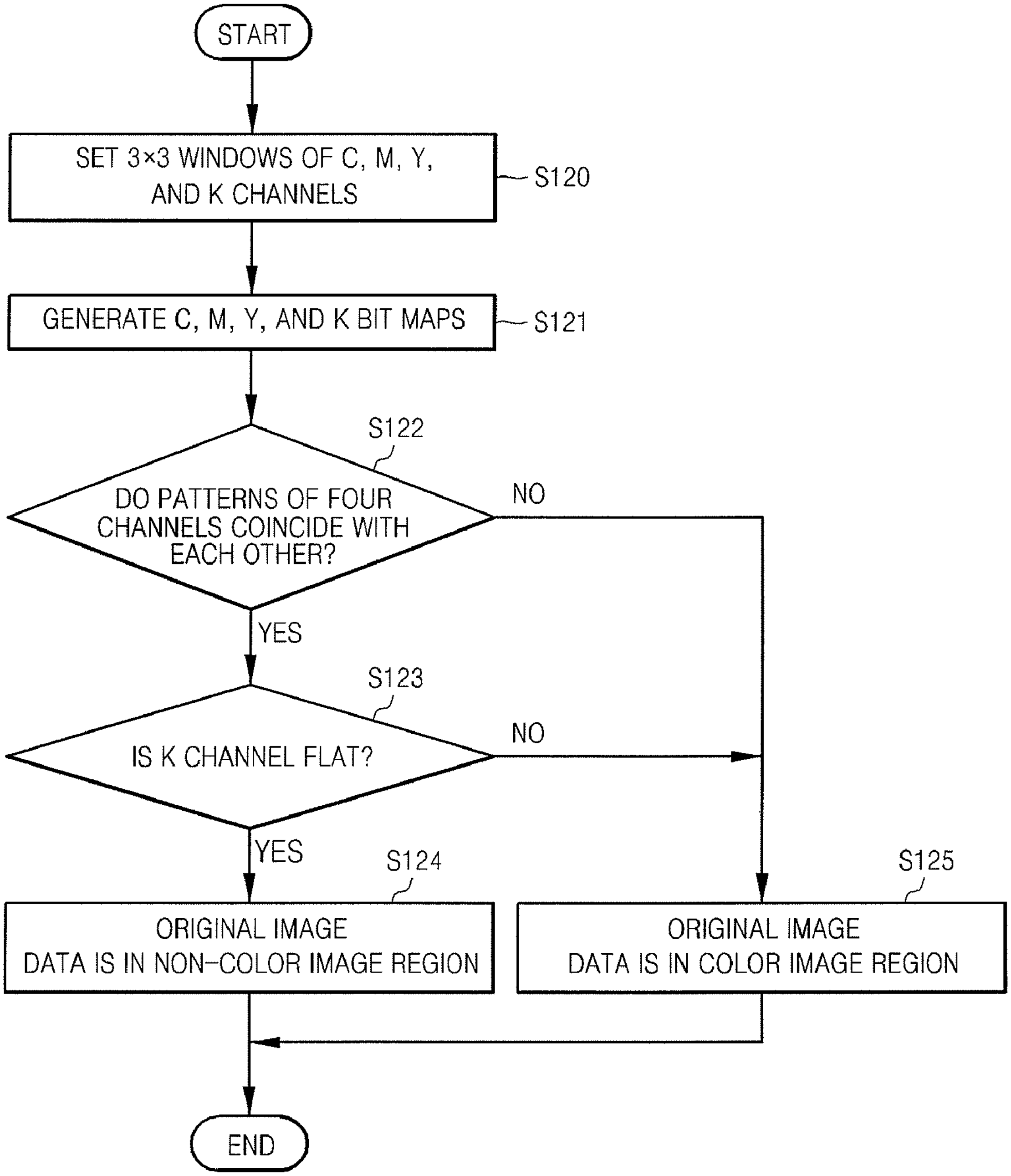
FIG. 3 is a flowchart illustrating processes of determining a color image region in FIG. 2.

FIG. 3 is a flowchart illustrating processes of determining a color image region in FIG. 2.

The processes of determining the color image region will be described with reference to FIG. 3. First, 3×3 windows are set for C, M, Y, and K channels in operation S120 and bit maps are generated by threshold values in operation S121 to determine whether the patterns of the C, M, Y, and K channels coincide with each other in operation S122.

When it is determined that the patterns coincide with each other, it is determined whether the K channel is flat in operation S123.

When it is determined that the K channel is flat, it is determined that the original image data is in a non-color image region in operation S124. This is because the patterns of the C, M, Y, and K channels coincide with each other and the K channel is flat in a multicolor black text region that is the non-color image region. When it is determined that the K channel is not flat, it is determined that the original image data is in the color image region in operation S125.

Figure 4:
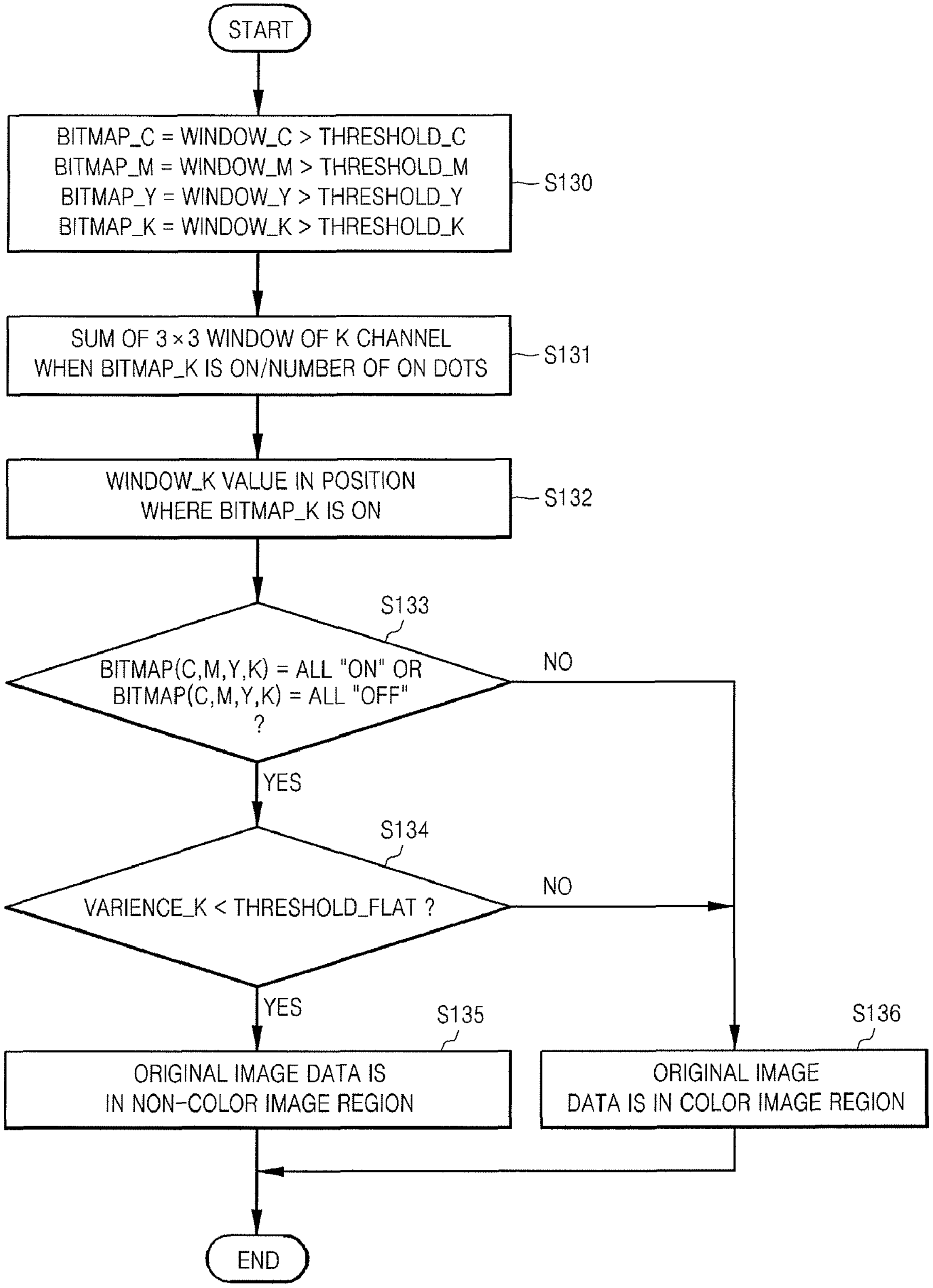
FIG. 4 is a flowchart illustrating detailed processes of determining the color image region in FIG. 3.

FIG. 4 is a flowchart illustrating detailed processes of determining the color image region in FIG. 3. Referring to FIG. 4, 3×3 bit maps are generated for 3×3 pixels of the C, M, Y, and K channels by threshold values in operation S130.

Then, an average value of window values in the position where the K channel bit map is dot on among the values in the 3×3 window of the K channel is obtained in operation S131 and a variance value Variance_K is obtained from the average value and the values of pixels dot on in the window in operation S132.

Then, it is determined whether the C, M, Y, and K channel bit maps generated in operation S130 have the same patterns. Therefore, it is determined that the patterns of the C, M, Y, and K channel bit maps coincide with each other when it is determined that the four channels are simultaneously dot on or off in all of the pixels in the 3×3 windows in operation S133. In addition, it is determined whether the K channel is flat in accordance with the variance value Variance_K obtained in S132. Therefore, it is determined that the K channel is flat when the variance value Variance_K is less than a previously set value Threshold_Flat in operation S134.

When the two conditions are satisfied, it is determined that the original image data is in the multicolor black text region that is the non-color image region in operation S135. That is, a degree to which the patterns of the four channels coincide with each other and a degree to which the K channel is flat are evaluated to find the non-color image region. This is because deviation between dot levels is small in the dot on position of the K channel where the patterns of the C, M, Y, and K channels coincide with each other and the C, M, Y, and K channels are simultaneously dot on in the non-color image region.

On the other hand, when any one of the two conditions is not satisfied, it is determined that the original image data is in the color image region in operation S136.

As described above, after performing the processes of determining whether the original image data is in the color image region, referring back to FIG. 2, edge information and directional information are extracted from the C, M, Y, and K channels in the color image region in operation S102.

As described above, since the image distortion caused by the mis-registration is mainly generated in the color image region at a boundary between adjacent colors, it is necessary to perform the processes of extracting the edge information and the directional information on each channel.

In the directional information obtained through such processes, an index value is 0 when there is no edge, is 1 when there is a rising edge, and is 2 when there is a falling edge.

That is, as described above, the directional information preferably includes the index value.

In addition, since a region generated at the boundary between the adjacent colors must be found, in order to determine whether the C, M, Y, and K channels are adjacent to each other, pixel values are extracted from the C, M, Y, and K channels, respectively in operation S103.

The pixel values are extracted from the channels, respectively, in order to determine whether the channels are adjacent to each other and the pixel values are used to determine whether the channels are adjacent to each other. As described above, after extracting the pixel values to extract the edge information and the directional information to determine whether the channels are adjacent to each other, boundary region information is detected using the extracted edge information, directional information, and pixel values in operation S104 and the detected boundary region information and a previously set and stored lookup table are compared with each other to select a channel to be extended in operation S105.

The channel to be extended is selected using the boundary region information from the previously stored lookup table. The lookup table and the boundary region information are compared with each other to find the channel that satisfies all of the conditions and to select the channel to be extended.

Hereinafter, the processes of determining whether the original image data is in the color image region and the processes of selecting the channel to be extended will be described in detail with FIG. 5.

FIG. 5 illustrates an input image set by a 3×3 window according to the present general inventive concept.

First, a gradient (Gx) value is obtained for the input image to detect edge information on the presence of an edge.

Here, the Gx value is obtained using the equation of $|(a2+a3+a4)-(a0+a6+a7)|$ and, when the obtained Gx value is larger than a previously set and stored reference value, it is determined that the edge exists.

The magnitudes of (a2, a0), (a3, a6), and (a4, a7) will be compared with each other to detect the directional information.

When all of (a2, a3, a4) are larger than (a0, a6, a7), that is, when $a2>a0$, $a3>a6$, and $a4>a7$, the edge is rising. When all of (a2, a3, a4) are smaller than (a0, a6, a7), the edge is falling.

The obtained Gx value is larger than the previously set and stored reference value and the edge is rising, the directional information detects the rising edge. When the obtained Gx value is larger than the previously set and stored reference value and the edge is falling, the directional information detects the falling edge.

The above-described processes are performed to detect the rising edges and the falling edges in the horizontal direction of the 3×3 windows of the C, M, Y, and K channels.

In addition, the rising edges and the falling edges are detected in the vertical direction as well as in the horizontal direction.

That is, after detecting the rising edges and the falling edges in the horizontal direction, the 3×3 window of the input image is rotated at 90 degrees to detect the rising edges and the falling edges in the vertical direction as well as in the horizontal direction.

The index value of the rising edge is 2, the index value of the falling edge is 1, and the index value is 0 when there is no edge.

In addition, A, B, and C values are obtained in order to determine whether the C, M, Y, and K channels are adjacent to each other. As illustrated in FIG. 5, in the 3×3 window of the input image, the A, B, and C values mean the pixel values of a7, a8, and a3.

The boundary region information is detected using the pixel values to extract the edge information and the directional information to determine whether the C, M, Y, and K channels are adjacent to each other, the channel to be extended is selected from the previously set and stored lookup table, the 3×3 window of the input image is rotated by 90 degrees to constitute the window in the vertical direction, and the channel to be extended in the vertical direction is selected.

As illustrated in FIG. 2, it is determined whether the rising edges and the falling edges of the C, M, Y, and K channels are detected in both of the horizontal and vertical directions in operation S106. When it is determined that the rising edges and the falling edges of the C, M, Y, and K channels are detected in the horizontal direction and in the vertical direction, it is determined whether to extend a selected channel in operation S107.

When it is determined that the rising edges and the falling edges of the C, M, Y, and K channels are not detected in both of the horizontal and vertical directions, that is, that the rising edges and the falling edges of the C, M, Y, and K channels are detected only in the horizontal direction, the process returns to S102 to detect the rising edges and the falling edges of the C, M, Y, and K channels in the vertical direction.

Then, when the selected channel is to be extended, the selected channel extends in operation S108 and, when the selected channel is not to be extended, the edge is emphasized in operation S109.

On the other hand, when it is determined that the original image data is not in the color image region, the boundary of the multicolor black text region is found using a Laplacian filter in operation S110. The found boundary of the multicolor black text region is image processed so that an image is not distorted by the mis-registration in S103 in operation S111.

Hereinafter, a method of constituting the lookup table that is a condition table in which the channel to be extended is previously determined in accordance with the conditions of the channels.

Figure 6A:
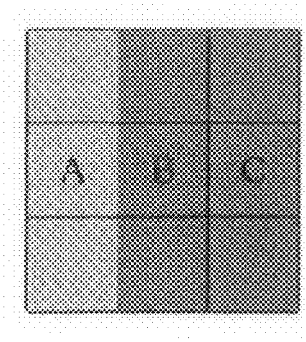
FIG. 6A is a view illustrating C and M channels that are adjacent to each other.
Figure 6B:
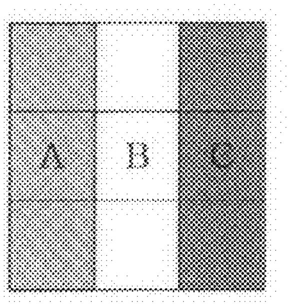
FIG. 6B is a view illustrating C and M channels that are remote from each other.
Figure 6C:
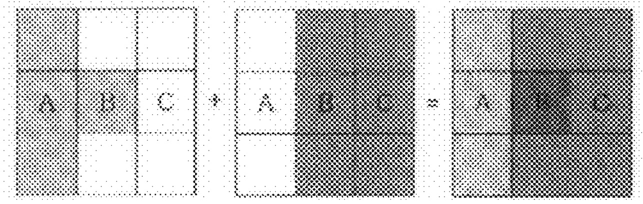
FIG. 6C is a view illustrating a result in which adjacent regions extend in FIG. 6A.

FIG. 6A illustrates C and M channels that are adjacent to each other. FIG. 6B illustrates C and M channels that are not adjacent to each other. FIG. 6C illustrates a result in which adjacent regions extend in FIG. 6A.

In order to constitute the lookup table, the combination of the index values and the A, B, and C values is previously constituted for each of the channels and which channel is to be extended must be previously determined in accordance with conditions. After obtaining the lookup table, the index values, that is, the directional information is extracted from the 3×3 window of each of the C, M, Y, and K channels of the input image and the pixel values that are the A, B, and C values are extracted in order to determine whether the channels are adjacent to each other on boundaries to detect the channel to be extended in accordance with the conditions from the lookup table.

First, the index values are obtained using the magnitudes and signs of the Gx values of the 3×3 windows of the C, M, Y, and K channels. It is not possible to correctly know how the two adjacent colors form a boundary only by the index values.

As illustrated in FIGS. 6A and 6B, the directions of the edges are opposite to each other. However, meanwhile the two colors, that is, the C channel and the M channel are adjacent to each other in FIG. 6A, the C channel and the M channel are not adjacent to each other in FIG. 6B.

That is, in FIG. 6A, it is determined that the C channel and the M channel are adjacent to each other since the index value of the C channel is 1 so that the falling edge exists, the index value of the M channel is 2 so that the rising edge exists, the pixel values that are the A, B, and C values of the C channel are 1, 0, and 0, and the pixel values that are the A, B, and C values of the M channel are 0, 1, and 1.

However, in FIG. 6B, it is determined that the C channel and the M channel are not adjacent to each other since the index value of the C channel is 1 so that the falling edge exists, the index value of the M channel is 2 so that the rising edge exists, the pixel values that are the A, B, and C values of the C channel are 1, 0, and 0, and the pixel values that are the A, B, and C values of the M channel are 0, 0, and 1.

Therefore, in FIG. 6A, it is determined that the C channel is to be extended in accordance with the combination and, like in FIG. 6C, the C channel is extended in a method of positioning the maximum value among the pixel values in the 3×3 window of the C channel in the center of the window.

On the other hand, when the lookup table is constituted and corrected based on a multicolor system, the channel to be extended is selected in accordance with other conditions in consideration of the multicolor. The following conditions are additionally required.

The K channel is not extended.

It is determined whether there is the value of the K channel in a pixel position that forms a boundary when the C, M, and Y channels are extended to extend the C, M, and Y channels when it is determined that there is no value of the K channel.

Both of the C channel and the M channel are extended when the C channel and the M channel are adjacent to each other so that the edge of the C channel and the edge of the M channel are in the opposite directions.

Either the C channel or the M channel is extended when the C channel or the M channel is adjacent to the K channel so that the edge of the C channel and the edge of the M channel are in the opposite directions.

Only the Y channel is not extended when the Y channel is adjacent to the C, M, and K channels.

However, the present general inventive concept is not limited thereto, and the channel to be extended can be selected in accordance with other conditions where a plurality of other color combinations are considered other than the above five conditions.

Figure 7A:
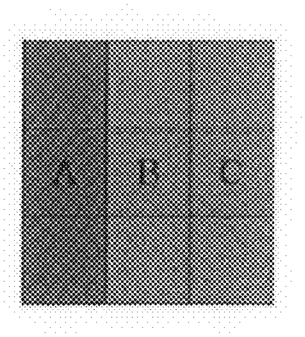
FIG. 7A is a view illustrating C, Y, and M channels that are adjacent to each other.

FIG. 7A illustrates C, Y, and M channels that are adjacent to each other. FIG. 7B illustrates an example of a lookup table according to FIG. 7A. In FIGS. 7A and 7B, the lookup table of the channels selected when the C, Y, and M channels are adjacent to each other.

As described above, the channels to be extended are previously determined by the index values and the pixel values that are the A, B, and C values of the channels in the lookup table.

Figure 8A:
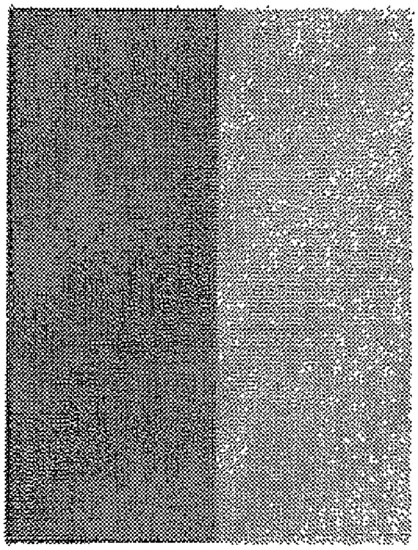
FIG. 8A is a view illustrating an original image and a distorted output image before performing correction.
Figure 8A:
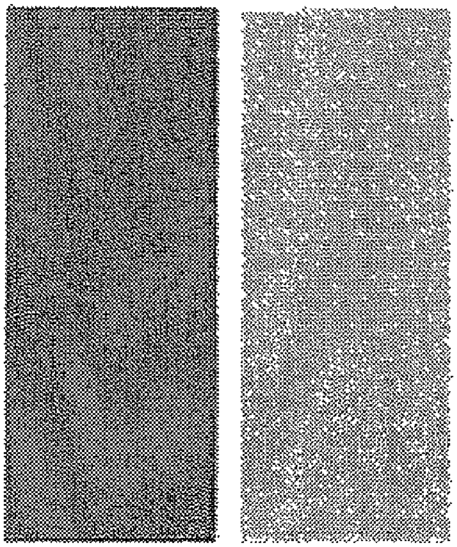
Figure 8B:
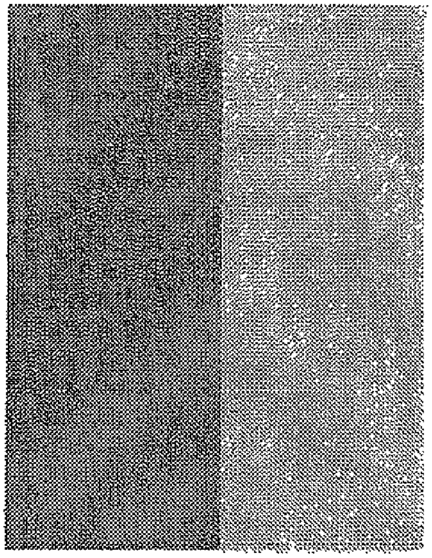
FIG. 8B is a view illustrating a corrected image and a corrected output image after performing correction.
Figure 8B:
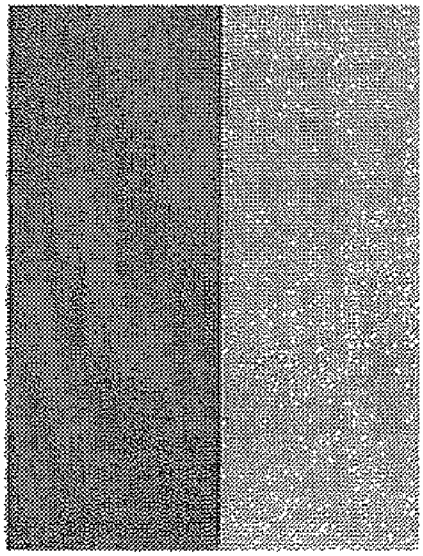
Figure 9:
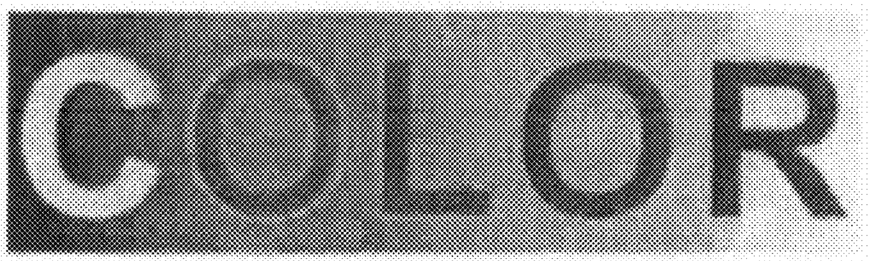
FIG. 9 is a view illustrating an actual image before and after performing correction.
Figure 9:
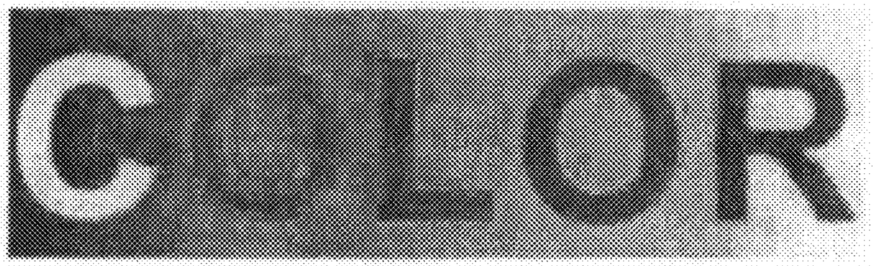

FIG. 8A illustrates an original image and a distorted output image before performing correction. FIG. 8B illustrates a corrected image and a corrected output image after performing correction. FIG. 9 illustrates an actual image before performing correction and an actual image after performing correction.

As illustrated in FIGS. 8A, 8B, and 9, meanwhile a white blank is generated at a boundary between colors as an example caused by the mis-registration generated in the color image region in an actual image before being corrected, the boundary between the colors is removed and the colors are well adjacent to each other in an actual image after being corrected.

As described above, in the method of controlling the color image forming apparatus according to the present invention, the mis-registration in which the C, M, Y, and K channels deviate from the positions where the channels are to be marked when the color image region is printed is generated. According to the present invention, the boundary between the colors extends to prevent the image from being distorted on the boundary of the color image region due to the mis-registration and to improve printing quality.

Various embodiments of the present general inventive concept can be embodied as computer readable codes on a computer-readable medium. The computer-readable medium includes a computer-readable recording medium and a computer-readable transmission medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable transmission medium can be distributed over network coupled computer systems, through wireless or wired communications over the internet, so that the computer readable code is stored and executed in a distributed fashion. Various embodiments of the present general inventive concept may also be embodied in hardware or in a combination of hardware and software.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling a color image forming apparatus that prints a color image using a plurality of color channels, the method comprising:

determining whether original image data is in a color image region;

detecting boundary region information on the plurality of color channels when it is determined that the original image data is in the color image region; and selecting a color channel to be extended using the detected boundary region information and extending the selected channel.

2. The method as claims in claim 1, wherein the plurality of color channels comprise C, M, Y, and K channels.

3. The method as claimed in claim 2, wherein the determining of whether the original image data is in a color image region comprises:

setting 3×3 windows for the C, M, Y, and K channels and generating C, M, Y, and K bit maps to determine whether the original image data is in the color image region based on whether patterns of the C, M, Y, and K channels coincide with each other and whether the K channel is flat.

4. The method as claimed in claim 3, wherein the determining of whether the original image data is in a color image region further comprises:

determining that the patterns of the C, M, Y, and K channels do not coincide with each other when all of the C, M, Y, and K channels are not simultaneously dot on or dot off in all pixels of the 3×3 windows.

5. The method as claimed in claim 3, wherein the determining of whether the original image data is in a color image region further comprises:

calculating a variance value from an average value of window values in a position where the K channel bit map is dot on among values in the 3×3 window and pixel values that are dot on in the 3×3 window to determine that the K channel is not flat when the calculated variance value is larger than or equal to a previously set value.

6. The method as claimed in claim 2, wherein the detecting of the boundary region information comprises:

extracting edge information and directional information on the C, M, Y, and K channels, and detecting the boundary region information on the C, M, Y, and K channels by using the extracted edge information and directional information.

7. The method as claimed in claim 6, wherein the detecting of the boundary region information further comprises:

extracting pixel values from the C, M, Y, and K channels to determine whether the C, M, Y, and K channels are adjacent to each other, and detecting the boundary region information on the C, M, Y, and K channels by using the extracted pixel values.

8. The method as claimed in claim 2, wherein the selecting of the color channel to be extended comprises:

comparing a previously set and stored lookup table and the detected boundary region information with each other to select the channel to be extended, and extending the selected channel.

9. A method of controlling a color image forming apparatus that prints a color image using a plurality of color channels, the method comprising:

determining whether original image data is in a color image region based on whether patterns of the color channels coincide with each other and whether a reference color channel is flat;

extracting edge information and directional information on the color channels and detecting boundary region information on the color channels based on the extracted edge information and directional information when it is determined that the original image data is in the color image region; and selecting a channel to be extended using the detected boundary region information and extending the selected channel.

10. The method as claimed in claim 9, wherein the determining of whether the original image data is in a color image region comprises:

setting 3×3 windows for the color channels and generating a plurality of bit maps for each color channel to determine whether the original image data is in the color image region based on whether patterns of the color channels coincide with each other and whether the reference color channel is flat.

11. The method as claimed in claim 9, wherein the color channels comprise C, M, Y, and K channels, and K is the reference color channel.

12. The method as claimed in claim 11, wherein the determining of whether the original image data is in a color image region comprises:

setting 3×3 windows for the C, M, Y, and K channels and generating C, M, Y, and K bit maps to determine whether the original image data is in the color image region based on whether patterns of the C, M, Y, and K channels coincide with each other and whether the K channel is flat.

13. The method as claimed in claim 12, wherein the determining of whether the original image data is in a color image region further comprises:

determining that the patterns of the C, M, Y, and K channels do not coincide with each other when all of the C, M, Y, and K channels are not simultaneously dot on or dot off in all pixels of the 3×3 windows.

14. The method as claimed in claim 13, wherein the determining of whether the original image data is in a color image region further comprises:

calculating a variance value from an average value of window values in a position where the K channel bit map is dot on among values in the 3×3 window and pixel values that are dot on in the 3×3 window to determine that the K channel is not flat when the calculated variance value is larger than or equal to a previously set value.

15. The method as claimed in claim 11, wherein the extracting of the edge information and directional information comprises:

extracting pixel values from the C, M, Y, and K channels to determine whether the C, M, Y, and K channels are adjacent to each other, and detecting the boundary region information on the C, M, Y, and K channels by using the extracted pixel values.

16. The method as claimed in claim 11, wherein the selecting of the channel to be extended comprises:

comparing a previously set and stored lookup table and the detected boundary region information with each other to select a channel to be extended, and extending the selected channel.

17. A method of controlling a color image forming apparatus that prints a color image using a plurality of color channels, the method comprising:

determining boundary information of the plurality of color channels to determine whether original image data are is in a color image region; and extending one color channel using the detected boundary according to whether the color channels are adjacent.

18. The method as claimed in claim 17, wherein the extending of the color channel comprises:

comparing a stored boundary information lookup table and the detected boundary region information to select the channel to be extended.

* * * * *